Patented Oct. 24, 1922.

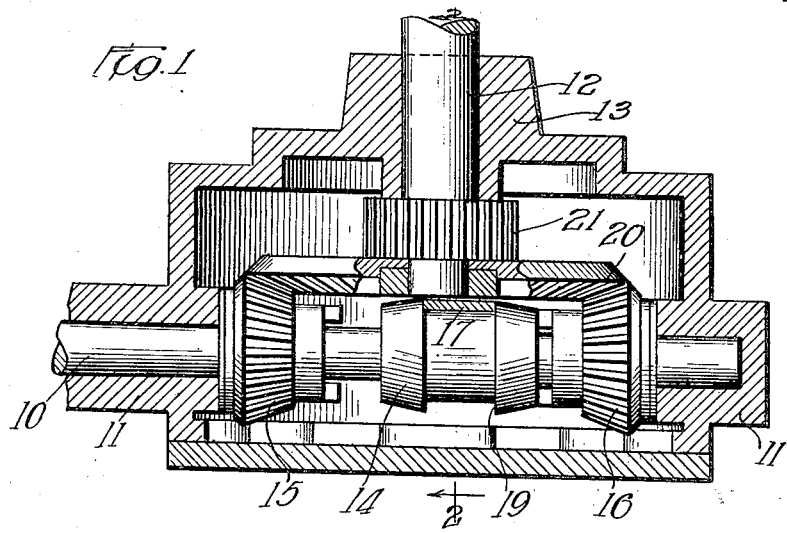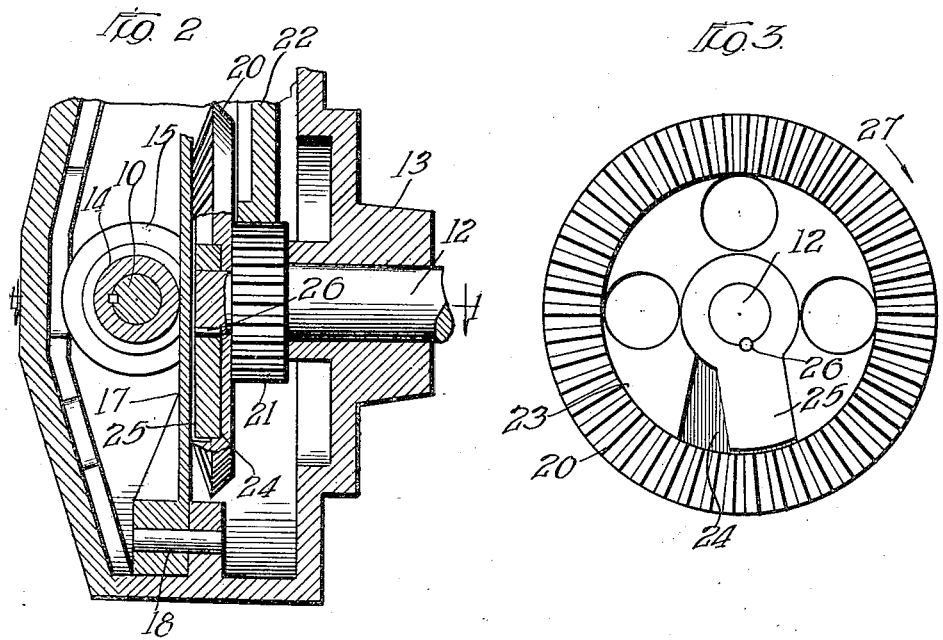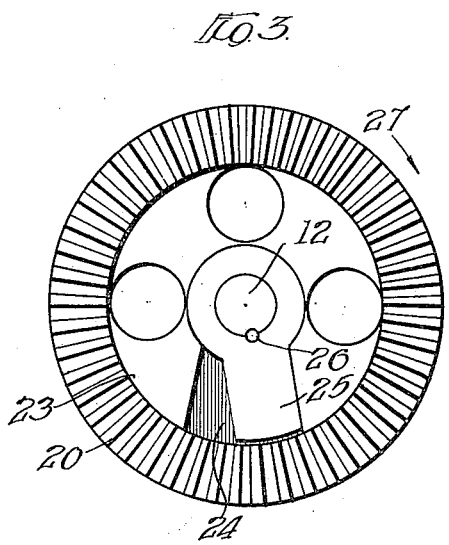

1,432,954

UNITED STATES PATENT OFFICE.

EDWARD E. BERTHOLD, OF CHICAGO, ILLINOIS.

LOST-MOTION CONNECTION FOR WASH MACHINES.

Application filed February 12, 1920. Serial No. 358,064.

*To all whom it may concern:*

Be it known that I, EDWARD E. BERTHOLD, a citizen of the United States, residing at Chicago, in the county of Cook and State of Illinois, have invented certain new and useful Improvements in Lost-Motion Connections for Wash Machines, of which the following is a specification.

My invention relates to power-driven washing machinery and particularly to the type in which an element or drum carrying the clothes is periodically rotated in opposite directions.

The primary object of my invention is to diminish the shock resulting when such a clothes-carrying element is reversed, to such an extent as to eliminate to a considerable extent the wear caused by shock and vibration in many of the machines of the prior art.

I accomplish this object in the embodiment of my invention herein disclosed by providing a lost-motion connection which allows the clothes-carrying element to come to rest for an instant before the transmission from the source of power operates to start it in the opposite direction.

Such a connection may be inserted at any point in the transmission from the source of power to the final driven element. I prefer, however, to locate it between parts having relatively slow speeds, to diminish the relative velocities of the parts between which lost motion takes place.

Another object is to provide such a connection comprising only a few relatively simple and rigid parts, and requiring no springs or friction transmission element of any sort.

Further objects and advantages of my invention will become apparent as the description proceeds.

In the accompanying drawings Figure 1 is a horizontal central section on the line 1—1 of Fig. 2 through a portion of the transmission to such a clothes-carrying element as above described, illustrating the application of my invention thereto. Fig. 2 is a vertical central section on the line 2—2 of Fig. 1 through the same device, and Fig. 3 is a face view of the large bevel gear.

In the embodiment of my invention selected for illustration a power-driven shaft 10 which for the purposes of the present invention may be considered a source of power, is suitably journaled in bearings 11 in the main casing of the transmission mechanism. A driven shaft 12 extending in this instance at right angles to the power shaft 10 is also journaled at 13 in the casing and it may be connected to the clothes-carrying element or drum (not shown). The power-driven shaft 10 carries a splined clutch element 14 adapted to engage the clutch teeth carried by two gears 15 and 16 rotatable on shaft 10. A suitable control lever 17 pivoted on a pintle 18 at the lower portion of the casing engages the central annular depression 19 of the clutch element 14 to shift it into operative engagement with either pinion 15 or 16. A large gear 20 rotatable around the axis of shaft 12 is always in mesh with each of the pinions 15 and 16.

The shaft 12 carries a pinion 21 meshing with a large gear 22 (see Fig. 2) which may carry automatic means for periodically actuating the lever 17. These automatic connections may be of any desired character, for instance, those disclosed in my Patent No. 1,366,690 issued January 25, 1921, but as they form no part of my present invention a detailed description thereof is deemed unnecessary.

The web 23 of the gear 20 has a depression 24 and the shaft 12 carries a radially projecting arm or driver 25 suitably attached at the end of the shaft as by means of a key 26. The radial arm 25 lies in the depression 24 and may shift from side to side therein through a considerable angle, as clearly indicated in Fig. 3.

In the position illustrated in Figs. 1 and 3, the large gear is being driven in a clockwise direction as indicated by the arrow 27. Upon actuation of the clutch element to disconnect shaft 10 from pinion 16 and subsequently to connect it to pinion 15 the direction of rotation of the gear 20 will be instantly reversed. The reversal of the driven shaft 12, however, will not occur until the counter-clockwise rotation of the gear 20 has moved to carry the other wall of the depression 24 against the side of the radial arm or driver 25, or if the clothes carrier operates sufficiently freely its momentum may be sufficient to tend to continue to rotate the shaft 12 so that the arm or driver 25 will be swung over into engagement with the other wall of the depression 24 whereupon it will drive the clothes carrier in the opposite direction.

The amount of lost motion may obviously be varied to suit requirements. Although, as illustrated, the angle is rather small, amounting to approximately 15°, it should be noted that this corresponds to three or four times that amount of rotation of gear 15. By the time the lost motion is taken up and a connection is established to positively move the shaft 12 and the clothes-carrying element connected thereto in the opposite direction, the clothes-carrying element will have come to rest. It will be obvious that the shock incident to starting the clothes-carrying element from a position of rest will be negligible compared with that produced by changing its motion from full speed in one direction to full speed in the opposite direction.

It will be seen that I have provided a very simple, efficient and durable transmission for the purposes set forth.

While I have described and illustrated in detail a specific embodiment of my invention, it should be clearly understood that the description is only for purposes of illustration and that many modifications and variations will naturally occur to those skilled in the art. I aim in the subjoined claims to cover all such legitimate variations and modifications.

I claim as my invention:

1. In wash machines and the like, in combination, a shaft, a gear carried by said shaft, said shaft projecting through said gear, a radial arm carried by the projecting end of said shaft, said gear having a depression in its face adapted to receive said radial arm, said depression being wider than said arm to allow lost-motion between said gear and said shaft.

2. In wash machines and the like, in combination, a shaft a gear carried by said shaft, said shaft projecting through said gear, and a radial arm carried by the projecting end of said shaft, said gear having a depressed portion forming a socket for said arm, said socket having side walls adapted to receive the sides of said arm in fitting engagement but spaced apart to allow said arm a predetermined amount of lost-motion.

In testimony whereof, I have hereunto set my hand.

EDWARD E. BERTHOLD.